Oct. 8, 1963 D. C. OLSON ET AL 3,106,374
GUARD FOR STATIC DISCHARGER
Filed May 2, 1962
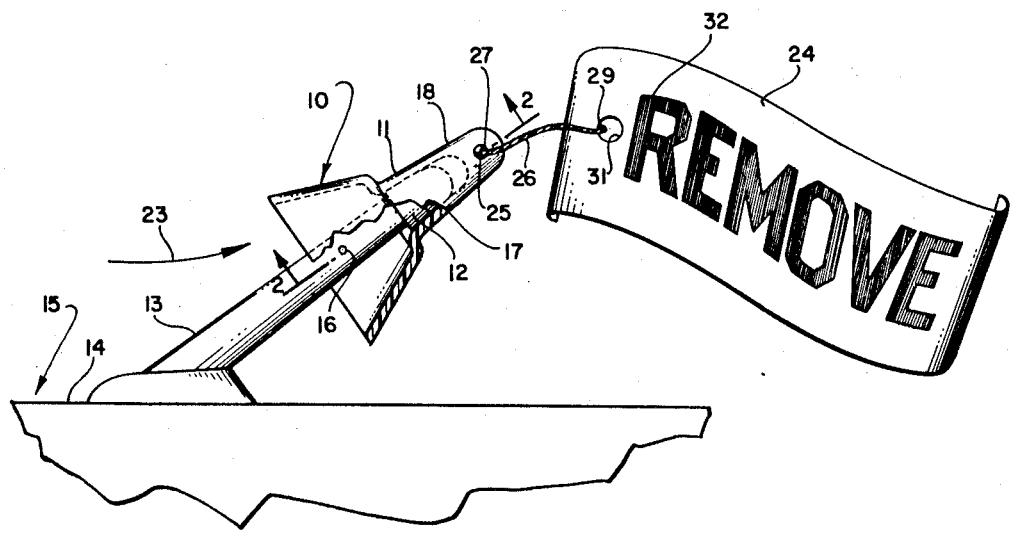
FIG_1
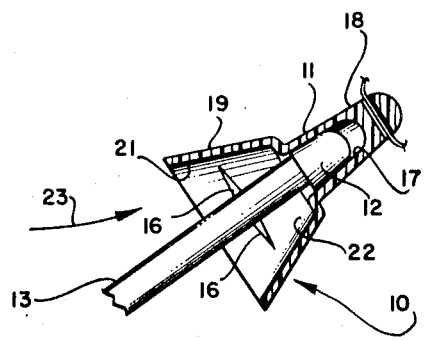
FIG_2
INVENTORS
DAVID C. OLSON
KEVIN G. WINKER
By *George C. Sullivan*
Agent United States Patent Office 3,106,374
Patented Oct. 8, 1963

3,106,374
GUARD FOR STATIC DISCHARGER
David C. Olson, Burbank, and Kevin G. Winker, Tarzana, Calif., assignors to Lockheed Aircraft Corporation, Burbank, Calif.
Filed May 2, 1962, Ser. No. 191,869
4 Claims. (Cl. 244—121)

This invention relates to a guard and more particularly to a new and improved guard for a static discharger normally provided on the external surface of an aircraft and comprising an aftwardly-extending rod having a pair of opposed, outwardly-extending pointed transverse elements adjacent to its outer end wherein the guard is detachably securable to the discharger for protecting the pointed elements against breakage and personnel adjacent thereto from damage due to the sharpness of elements.

Most aircraft are now provided with external static discharges which include an aftwardly-extending rod of metallic material fixed to the external surface of the craft for discharging static charges accumulated in the surface of the craft into the atmosphere. It has been established, in recent development, that the charges are more easily, readily and completely discharged from the surface when the aftwardly-extending rod is provided with a plurality of opposed, outwardly-extending, pointed or tapered transverse elements adjacent to its outer end, to increase the ability of the rod to discharge. Such elements, although making the discharge of the rod more effective, have been found to be a peril to personnel working in the area from which the rod extends, because of its sharp points. Further, the elements are subject to breakage while the aircraft is on the ground inasmuch as the points are subject to inadvertent engagement by personnel or equipment adjacent to the aircraft.

It is therefore preferable, and an object of this invention, to provide a guard for protecting the tip of the rod and of the sharpened points so as to lessen the propensity to breakage thereof or of causing damage to personnel or equipment adjacent thereto, while the aircraft is idle on the ground.

In order that the full effectiveness of the sharpened points and end of the static discharger is available when the aircraft is airborne, it is further preferably, and therefore another object of this invention, to provide a new and improved guard for a static discharger of the character described which is easily and readily removable from the tip so as to expose the tip and the points when the aircraft is airborne and which, if inadvertently left in its installed position relative to the discharger, is automatically removed from the discharger in response to the effect of the airstream subjected thereto when the aircraft is airborne and reaches a flying speed.

Other objects of this invention include the provision for forming the guard from a material which is sufficiently pliable so as to cushion any shock applied to the discharger while the guard is installed thereon; a guard which is effectively colored so as to have a relatively high visibility so as to attract the attention of ground personnel prior to the take off of the aircraft so as to remind the personnel to remove the guard; and further, includes means for specifically reminding personnel to remove the guard prior to takeoff by providing flag means secured to the guard so as to attract the attention of the personnel.

Because of the high percentage of anticipated guard loss due to the fact that the personnel have many duties to perform prior to the takeoff and because the removal of the guard may be therefore frequently overlooked, it is a further object of this invention to provide a guard of the character described which is relatively economical to manufacture and is capable of mass production whereby the guards are, after the aircraft is airborne, relatively expendable and economical to replace.

Yet another object of this invention is to provide a new and improved guard of the character described which overcomes disadvantages of prior means and methods heretofore intended to accomplish generally similar purposes.

These and other objects of this invention will be more apparent from the following detailed description, drawings, and appended claims.

In the drawings:

FIGURE 1 is a side view, in elevation, of a guard illustrated as being associated with a static discharger, with parts broken away for greater clarity; and FIGURE 2 is a fragmentary, cross-sectional view, as taken substantially along the line 2—2 of FIGURE 1.

Referring in detail to the drawings, there is shown by way of illustration, but not of limitation, a new and improved guard designed and constructed in accordance with this invention and generally designated by the numeral 10. The guard 10 includes, generally, a body 11 die cast or otherwise formed of a relatively pliable material, such as plastics, rubber, neoprene, or the like, illustrated as being detachably secured to an outer end 12 of a static discharger 13 secured to the outer surface 14 of an aircraft generally designated by the numeral 15. The static dischargers include a rod-like body generally extending aftwardly relatively to the aircraft so as to discharge static charges built up in the body 11 from its tip 12 and more precisely, its laterally and outwardly-extending opposed tapered or sharpened elements 16 adjacent to and spaced from the end 12. The opposed elements 16 are shown herein; however, it is to be understood that any number of such elements 16 may be provided for the rod 13 as is desired, the more elements 16 being provided, the more effective the discharge of the static discharge transmitted from the body surface 14 to the atmosphere.

The body 11 is preferably configured so as to be detachably securable to the outer end 12 by extension of the end 12 into an axial bore 17 of a reduced end 18 of the body whereby the body 11 is frictionally held on the end 12 but detachable therefrom in response to an axially pulling force on the reduced end 18 in an aftward direction. The body 11 is further configurated with an axial annular skirt 19 positioned to surround the elements 16 when the body 11 is secured to the discharger 13. The skirt 19 is preferably of a frusto-conical configuration providing an opening 21 for communicating the interior 22 of the guard to the atmosphere in a forward direction relative to the aircraft 15 so as to be subject to an aftwardly-directed airstream, indicated by the arrowed line 23 in FIGURES 1 and 2, when the aircraft is airborne.

To remind personnel servicing the aircraft that the guard 10 is to be removed from the discharger 13 before takeoff of the aircraft, flag means, in the form of a relatively flexible, rectilinear, or otherwise configurated, material 24 is secured to the body 11 to be integral therewith by means of a tie member 26. The member 26, comprises a wire, string, or other suitable material, having one end 27 secured in a transverse opening 28 of the reduced end 18 of the body 11 and an opposite end 29 secured thereto a hole 31 extending through the flag 24. The flag 24 is preferably provided with indicia 32 indicating instructions for use of the flag 24, such as the legend "Remove," printed, stamped, sprayed or otherwise imprinted thereon.

Further, the exterior of guard body 11 and the flag 24 are preferably provided in a brilliant yellow or other highly visible color to attract attention thereto so as to lessen the probability of inadvertent failure to remove the guard 10 from the discharger 13 prior to takeoff.

In the event that, in spite of the color of the guard 10 and the flag 24, the personnel fails to remove the guard 10 from the discharger prior to takeoff of the aircraft, the guard 10 is automatically detached from the end 12 of the discharger when the aircraft has been airborne and reaches its flying speed. This is due to the relatively large area of the open end 21 communicating with the interior 22 whereby the guard 10 is automatically detached in response to the airstream entering the opening 21.

While there is herein shown and described what is conceived to be the most practical and preferred embodiment of this invention, it is recognized that departures may be made therefrom within the scope of this invention which is not limited to the details disclosed herein but is to be accorded the full scope of the claims so as to embrace any and all equivalent devices.

What is claimed is:

1. In a guard for a static discharger secured to the external surface of an aircraft and including an aftwardly-extending outer end having a plurality of opposed, outwardly-extending pointed transverse elements adjacent to the outer end, said guard comprising:
    (a) a body of relatively pliant material having an axial bore adapted to frictionally and detachably internally receive said outer end of said discharger; and
    (b) an annular skirt whose annular wall defines an enlarged opening communicating with said bore and substantially larger than the overall dimension of said pointed elements and surrounding said elements when said body is secured to said outer end, said body being responsive to, force airstream of the aircraft for detaching said body from the outer end of the static discharger when said aircraft is airborne.

2. In a guard for a static discharger secured to the external surface of an aircraft and including an aftwardly-extending end having a pair of opposed, outwardly-extending pointed transverse elements adjacent to its outer end, said guard comprising:
    (a) a body of relatively pliant material having an axial bore at one end adapted to frictionally and detachably externally fit over said outer end of said discharger; and
    (b) an annular skirt having an annular wall defining a large opening adjacent to the opposite end of said body and communicating with said bore, said annular skirt being substantially larger than the overall dimension of said pointed elements and surrounding said elements when said body is secured to said outer end, said body being responsive to said airstream of the aircraft directed into said enlarged end for detaching said body from said end when said aircraft is airborne; and
    (c) flag means of relatively flexible material secured to said one end of said body for removing said body from the discharger in response to an axial pull on said flag in a direction opposite to said enlarged opening.

3. A guard as defined in claim 1, wherein said wall of said skirt is radially and outwardly spaced from said pointed tips of said elements.

4. In a static discharger secured to the external surface of an aircraft and including an aftwardly-extending end of electrical conductive material having at least a pair of opposed, outwardly-extending pointed transverse elements adjacent to its outer end, the combination with:
    (a) a guard for protecting said outer ends and said pointed tips, said guard comprising:
    (b) a body of relatively pliant material having a reduced end and an enlarged, flared open end;
    (c) means defining an axial bore in said reduced end and adapted to frictionally externally fit said outer end of said discharger; and
    (d) means defining an enlarged bore in said enlarged end and communicating between said open end and said bore, said skirt being circumjacent to said pointed elements when said guard is frictionally secured to said outer end and being responsive to the force of air stream directed in said enlarged open end of said guard when the aircraft is airborne for automatically removing said guard from the static discharger.

References Cited in the file of this patent

UNITED STATES PATENTS

| | | |
|---|---|---|
| 2,333,144 | Bennett et al. | Nov. 2, 1943 |
| 2,532,316 | Larkin | Dec. 5, 1950 |
| 2,786,353 | Slabaugh | Mar. 26, 1957 |

OTHER REFERENCES

Ramp and Hangar Equipment, July 1, 1947, page 25.